(12) United States Patent
Coleman et al.

(10) Patent No.: US 10,625,428 B2
(45) Date of Patent: Apr. 21, 2020

(54) END EFFECTOR WITH SELECTIVELY DEFORMABLE INTERFACE

(71) Applicant: Amazon Technologies, Inc., Seattle, WA (US)

(72) Inventors: Gregory Coleman, Somerville, MA (US); Beth A. Marcus, Bedford, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/018,748

(22) Filed: Jun. 26, 2018

(65) Prior Publication Data

US 2019/0389081 A1  Dec. 26, 2019

(51) Int. Cl.
*B25J 15/00* (2006.01)
*B25J 15/06* (2006.01)

(52) U.S. Cl.
CPC .................. *B25J 15/0616* (2013.01)

(58) Field of Classification Search
CPC ... B25J 15/0641; B25J 13/086; B25J 15/0616
USPC .................. 294/183, 185, 189
See application file for complete search history.

(56) References Cited

U.S. PATENT DOCUMENTS

| | | | | |
|---|---|---|---|---|
| 3,734,325 A * | 5/1973 | Stone | .................. | B66C 1/0212 414/626 |
| 5,344,202 A * | 9/1994 | Ramler | .................. | B25J 15/0616 294/188 |
| 5,984,623 A * | 11/1999 | Smith | .................. | B65G 61/00 294/104 |
| 6,561,744 B2 * | 5/2003 | Liang | .................. | H01L 21/6838 294/183 |
| 8,251,415 B2 * | 8/2012 | Lomerson, Jr. | ....... | B25J 15/0616 294/2 |
| 8,525,955 B2 * | 9/2013 | Long | .................. | H05B 3/84 349/82 |
| 2006/0043747 A1 * | 3/2006 | Kniss | .................. | B25J 13/086 294/65 |
| 2009/0320417 A1 * | 12/2009 | Gilmore | ............... | B25J 15/0052 53/473 |
| 2012/0207574 A1 * | 8/2012 | La Rovere | ............... | B25J 15/00 414/751.1 |
| 2014/0037413 A1 * | 2/2014 | Takashima | ........... | B25J 15/0675 414/680 |
| 2015/0375401 A1 * | 12/2015 | Dunkmann | ............ | B65G 47/91 700/228 |

(Continued)

*Primary Examiner* — Paul T Chin
(74) *Attorney, Agent, or Firm* — Patterson + Sheridan, LLP

(57) ABSTRACT

Implementations of an end effector and an associated method of grasping an item are disclosed. The end effector comprises an interface system comprising a mounting plate having at least a first portion movable relative to at least a second portion. For example, the first portion and/or second portion are configured to pivot about at least a first pivot axis. The interface system further comprises a pliable body member attached to the mounting plate and at least partially defining an inner recess. The end effector further comprises a pair of actuators operably connected to the plate and each configured to apply a force to the plate so as to pivot a portion of the mounting plate and deform the pliable body member. The end effector further comprises a vacuum port in fluid communication with the inner recess.

20 Claims, 11 Drawing Sheets

(56) References Cited

U.S. PATENT DOCUMENTS

2016/0214812 A1* 7/2016 Johnson ............... B65H 3/0816
2019/0084012 A1* 3/2019 McCoy, Jr. .......... B25J 15/0675

* cited by examiner

END EFFECTOR WITH SELECTIVELY DEFORMABLE INTERFACE

BACKGROUND

The present disclosure relates to grasping items using an end effector, and more specifically, to implementations of a suction-based end effector with a selectively deformable interface.

In warehouse operations and other industrial automation settings, end effectors may be configured to perform the picking and handling of items. For example, end effectors such as suction cups or vacuum cups may be used to suction items as they are being moved between locations in a warehouse. The performance of suction-based end effectors is largely dependent on the quality of the seal formed with the suctioned item. More specifically, a suctioned item may be dropped by the end effector and/or damaged when inertial forces caused by moving the item overcome the suction force.

BRIEF DESCRIPTION OF DRAWINGS

Various embodiments in accordance with the present disclosure will be described with reference to the drawings, where like designations denote like elements.

DETAILED DESCRIPTION

Figure 1A:
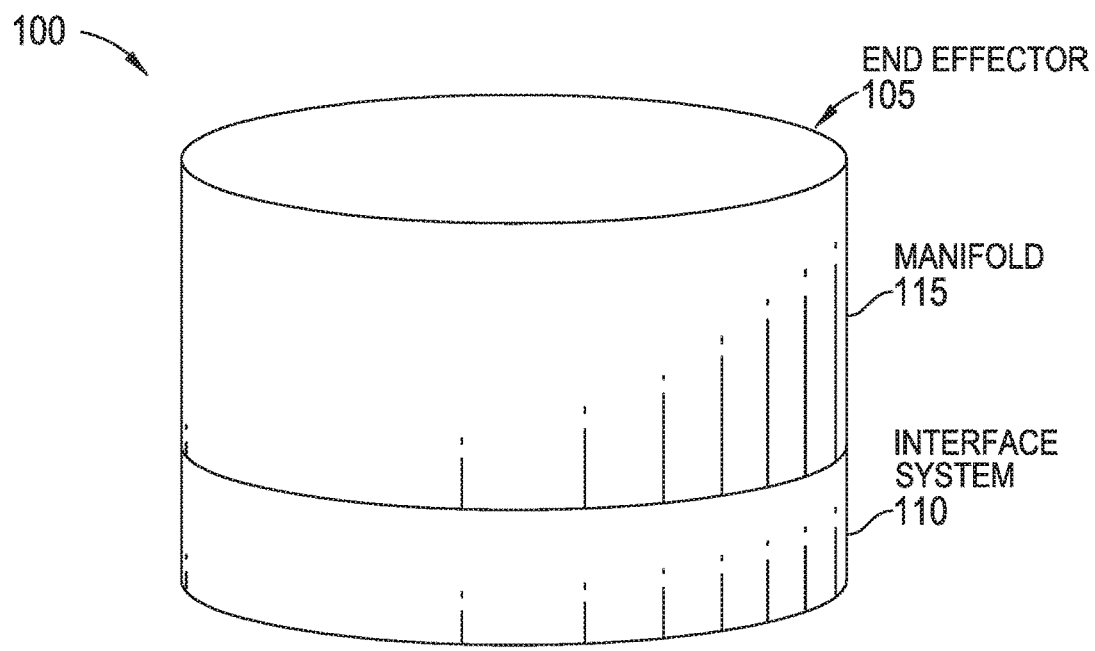
FIGS. 1A and 1B are diagrams of an exemplary end effector, according to various embodiments.

While conventional suction-based end effectors may be effective at moving items having relatively large planar surfaces, the ability to move items without suctioning a single planar surface (e.g., an item lacking a planar surface, an item having a planar surface that is inaccessible in a particular orientation, and so forth) remains a technical challenge. The end effectors described herein comprise one or more actuators or elements (including passive elements) that are operable to selectively apply a force to a movable plate of an interface system, which moves and deforms the plate and/or deforms the interface system according to one or more degrees of freedom. For example, the plate may pivot and/or bend so as to conform the interface system. In some embodiments, the applied force deforms a pliable body member of the interface system, which alters a geometry of a sealing surface or surfaces that contacts the item so as to better contour about non-planar surfaces the item, such as edges and curves. In some embodiments, the applied force alters a relative orientation of different sealing surfaces of the interface system. Through the plate and/or the deformed interface system, the end effector is capable of forming and maintaining an improved seal with the item, enabling items with complex and/or irregular shapes to be manipulated at greater velocities and/or accelerations without a loss of suction and/or without damaging the items.

According to one or more embodiments, a method of grasping an item using an end effector is disclosed. The method comprises moving a plate about a first axis into a deformed position. For example, the plate may be pivoted and/or deformed about the axis. In some embodiments, one or more actuators are configured to apply a force at one or more lateral portions of the plate. The method further comprises contacting an item with a sealing surface of the pliable body while the plate is in the deformed position, maintaining a vacuum between the item and the pliable body, and grasping the item via the pliable body. Through moving the plate, the end effector is capable of forming and maintaining an improved seal with the item, enabling items with complex and/or irregular shapes to be manipulated at greater velocities and/or accelerations without a loss of suction and without damaging the items.

In some embodiments, the method further comprises, using imagery acquired by one or more visual sensors, identifying a target contact region of the item and determining a geometry of the target contact region. Moving the plate is based on the geometry of the target contact region, and the method may further comprise reorienting the interface system relative to the item based on the contact region. In this way, the operation of the end effector may be adapted to accommodate the current orientation of an item. Further, by contacting the item in its current orientation and forming a relatively good seal with the deformed interface allows for faster movement of the item and supports a greater overall throughput of items.

Figure 1B:
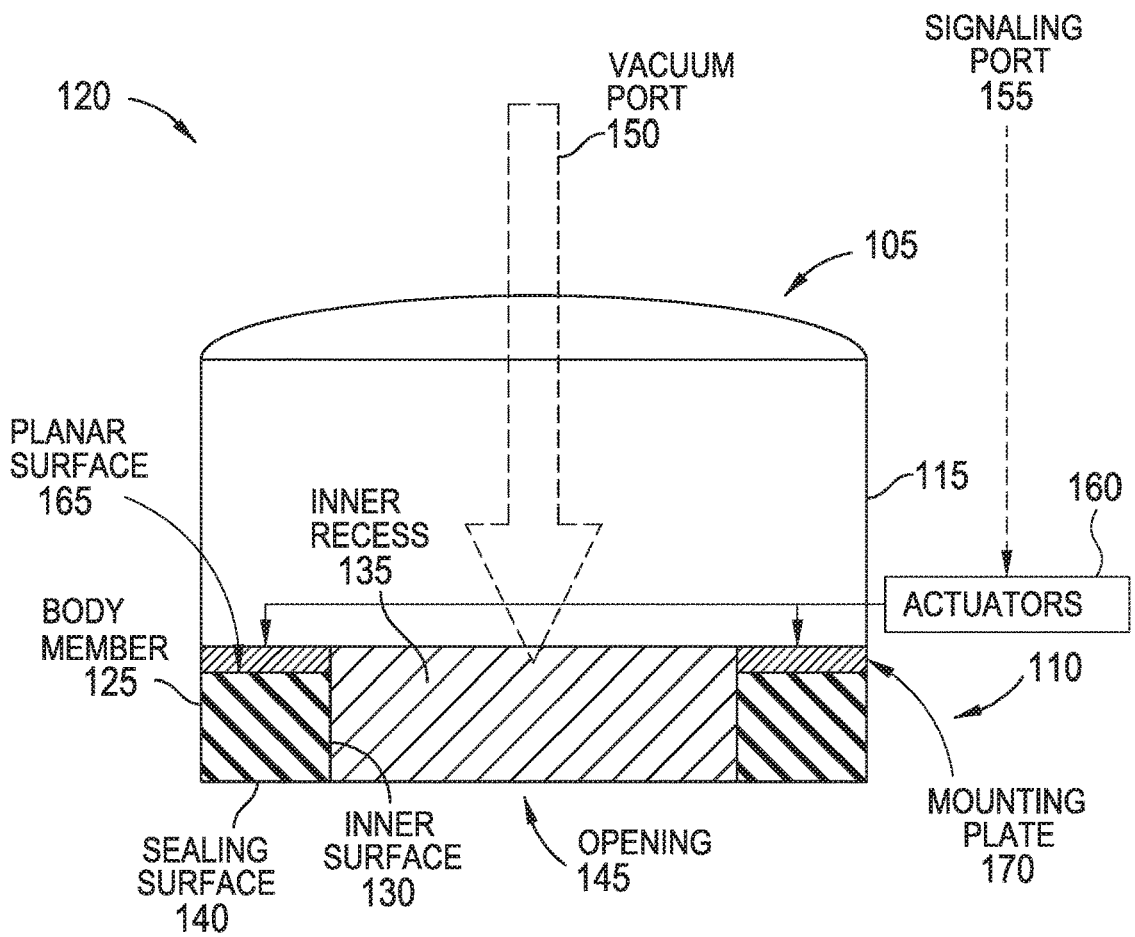

FIGS. 1A and 1B are diagrams 100, 120 of an exemplary end effector 105, according to various embodiments. More specifically, the diagram 100 represents an exterior view of the end effector 105, and the diagram 120 represents a cross-sectional view of the end effector 105. The end effector 105 may be used within an industrial automation system or any alternate environment suitable for moving items.

The end effector 105 comprises an interface system 110 attached to a manifold 115. The interface system 110 comprises a pliable body member 125 (or "body member") made of any pliable material(s) suitable for forming a seal with a contacting item and maintaining a vacuum. In some embodiments, the pliable body member 125 comprises a suitable closed cell or open cell foam. Some non-limiting examples of pliable materials include polymeric foams such as nitrile rubber foam, polyurethane foam, silicon foam, polychloroprene foam (neoprene), and so forth. Other non-limiting examples of pliable materials include elastomeric materials such as latex, rubber, and silicone.

The pliable body member 125 comprises an inner surface 130 defining an inner recess 135 (also referred to as a "region", a "central region", or a "vacuum region"). The pliable body member 125 may be monolithic or may comprise a plurality of sections arranged in such a manner that a vacuum may be maintained between the pliable body member 125 and the item to be grasped. The pliable body member 125 may be configured to entirely circumscribe the inner recess 135. In some embodiments, when the pliable body member 125 is in an undeformed state, the inner surface 130 and/or the inner recess 135 have elliptical shapes, such as an ellipse or a circle. When viewed from a top view, the manifold 115 and the interface system 110 may have elliptical shapes that are concentric and coextensive. However, other suitable shapes, sizes, and/or non-concentric arrangements of the manifold 115 and the interface system 110 are also possible.

The pliable body member 125 further comprises a sealing surface 140 at a distal end of the pliable body member 125. The distal end of the pliable body member 125, at which items may be contacted and/or suctioned to the end effector 105, may correspond to a distal end of the end effector 105. The sealing surface 140 defines an opening 145 to the inner recess 135. In some embodiments, bringing an item into contact with the sealing surface 140 causes the sealing surface 140 to conform to a contour of the item and thereby seals the inner recess 135 from ambient.

The end effector 105 comprises a plurality of ports. A vacuum port 150 is in fluid communication with the inner recess 135 and is configured to apply a vacuum to the inner recess 135 (e.g., when sealed by the sealing surface 140). A signaling port 155 is in communication with one or more actuators 160, and control signals communicated via the signaling port 155 cause the one or more actuators 160 to selectively apply a force to, or otherwise cause a compliant interaction with, the interface system 110. Depending on the configuration of the one or more actuators 160, the applied force deforms the interface system 110 according to one or more degrees of freedom. In some embodiments, the pliable body member 125 is attached to a mounting plate 170 and the applied force causes the mounting plate 170 to move (for example, pivot). In some embodiments, the applied force deforms the pliable body member 125, which alters a geometry of the sealing surface 140. In some embodiments, the applied force alters a relative orientation of different sealing surfaces 140 of the interface system 110.

The one or more actuators 160 may be of any suitable type(s). For example, the one or more actuators 160 may be actuatable according to any suitable means, such as pneumatic, hydraulic, mechanical, motorized, and so forth. Further, the one or more actuators 160 may comprise active and/or passive actuators. Some non-limiting examples of the one or more actuators 160 include linear actuators and rotary actuators. In one embodiment, the one or more actuators 160 comprise one or more linear actuators attached to the interface system 110, and deforming the interface system 110 comprises increasing a length of the one or more linear actuators.

In some embodiments, the pliable body member 125 in an undeformed state has a planar surface 165 at a proximal end opposite the distal end. Stated another way, a proximal surface of the pliable body member 125 may be within a single plane in the undeformed state, regardless of the overall shape of the pliable body member 125. Conventional implementations of a foam suction cup may be configured to maintain the planar surface 165 during operation (e.g., rigidly attached and not permitted to deform), which limits the ability of the foam suction cup to suction to irregular, complex, and/or heavy items. In such a case, the performance of the conventional foam suction cup is based solely on the compliance of the foam.

In some embodiments, the one or more actuators 160 may be used to apply force to the pliable body member 125 at the planar surface 165, whether directly or indirectly (e.g., via one or more intermediate components). In this way, one or more degrees of freedom are provided to manipulate the pliable body member 125, which permits the pliable body member 125 to be dynamically shaped to more closely match a surface geometry of an item to be suctioned. This increases the compatibility of the pliable body member 125 with different types of items having irregular or complex geometries. This also increases the quality of the seal formed with a suctioned item, allowing heavier items to be moved and/or the items to be moved more rapidly.

The manifold 115 may represent a continuously rigid portion of the end effector 105, and may be used to interface with other components of the industrial automation system. For example, one or more mechanical arms for spatially manipulating the end effector 105 (e.g., displacing and/or rotating) may be attached to the manifold 115. In another example, the manifold 115 may provide points of attachment to the end effector 105, e.g., such as attaching a hose to the vacuum port 150 and/or attaching a cable, hose, etc. to the signaling port 155.

The manifold 115 may be formed of any suitable material (s), which may include relatively inelastic material(s) such as plastics or metals. However, in some cases, the manifold 115 may be formed of elastic material(s) and dimensioned to provide a greater rigidity than the pliable body member 125 in the first structural state. In one non-limiting example, the manifold 115 may be formed of a same elastomeric material as the pliable body member 125, but has a much greater thickness than walls of the pliable body member 125. In some cases, the manifold 115 formed of elastic material(s) may be deformable or selectively deformable.

The manifold 115 and the interface system 110 may be connected through any suitable means. In some embodiments, the manifold 115 and the interface system 110 are removably connected using threaded fasteners such as screws or bolts. In other embodiments, the manifold 115 and the interface system 110 are integrally formed.

Figures 2A, 2B:
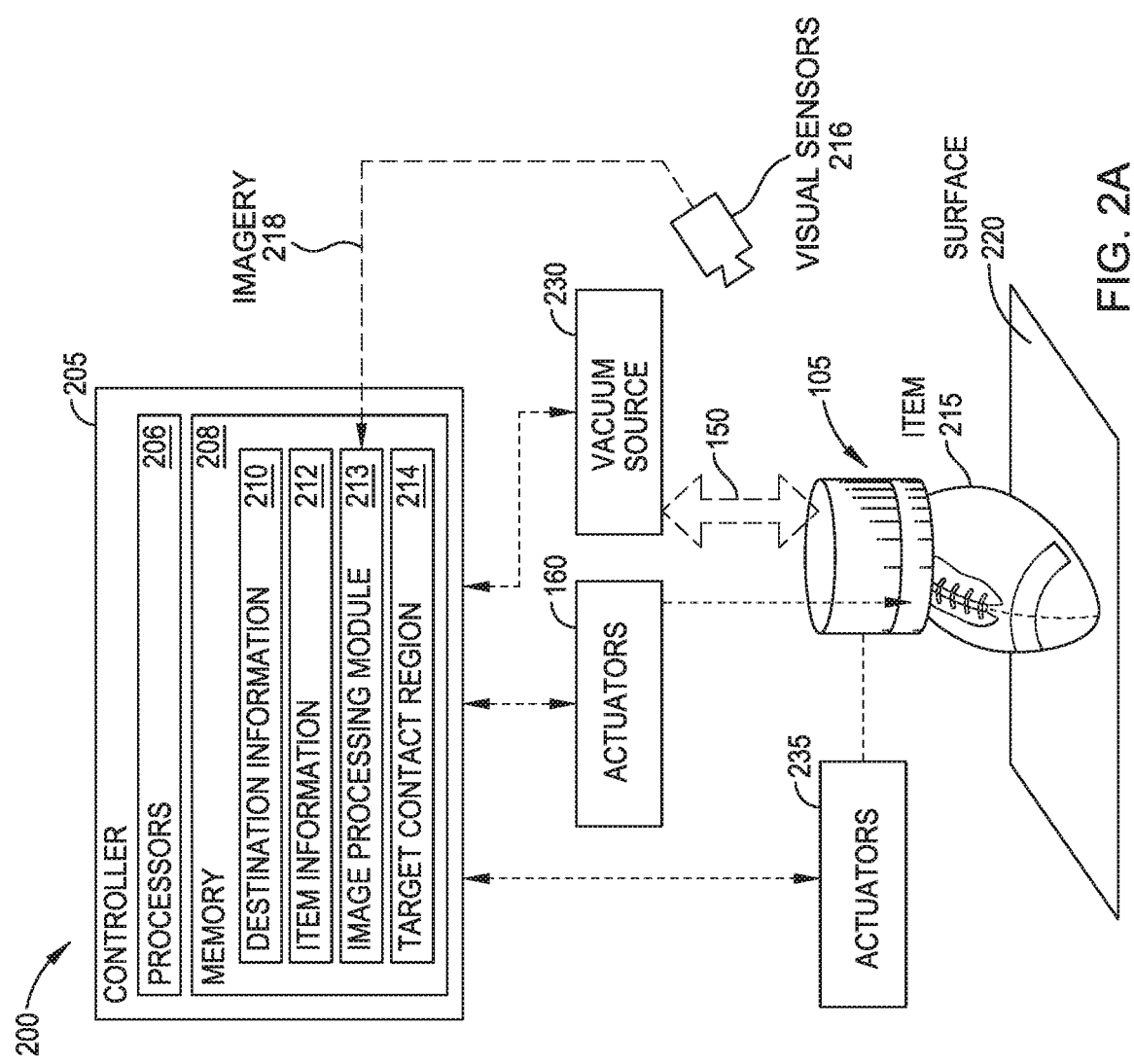
FIGS. 2A and 2B illustrate moving an item using an end effector, according to various embodiments.

FIGS. 2A and 2B illustrate moving an item using an end effector, according to various embodiments. The features illustrated in diagrams 200, 240 may be used in conjunction with other embodiments, such as the end effector 105 of FIGS. 1A and 1B.

The diagram 200 comprises a controller 205 that is configured to interface with the end effector 105 through at least the vacuum port 150 and the one or more actuators 160 via the signaling port 155. In some embodiments, the controller 205 is further configured to interface with the end effector 105 through one or more actuators 235 connected thereto. The one or more actuators 235 may have any suitable form, and may control the end effector 105 according to one or more degrees of freedom. For example, the one or more actuators 235 may be configured to translate and/or rotate the end effector 105. Some non-limiting examples of the one or more actuators 235 comprise articulating and/or telescoping robotic arms, which may attach to a proximal end of the end effector 105.

The controller 205 comprises one or more computer processors 206 and a memory 208. The one or more computer processors 206 represent any number of processing elements that each can include any number of processing cores. Some non-limiting examples of the one or more computer processors 206 include a microprocessor, a digital signal processor (DSP), an application-specific integrated chip (ASIC), and a field programmable gate array (FPGA), or combinations thereof. The memory 208 may comprise volatile memory elements (such as random access memory), non-volatile memory elements (such as solid-state, magnetic, optical, or Flash-based storage), and combinations thereof. Moreover, the memory 208 may be distributed across different mediums (e.g., network storage or external hard drives).

The memory 208 may comprise a plurality of "modules" for performing various functions described herein. In one embodiment, each module includes program code that is executable by one or more of the computer processors 206. However, other embodiments may include modules that are partially or fully implemented in hardware (i.e., circuitry) or firmware of the controller 205. As shown, the memory 208 comprises an image processing module 213 configured to perform image processing on imagery 218 received from one or more visual sensors 216 in the environment. The imagery 218 may have any suitable form, such as one or more still images or video.

In some embodiments, the image processing module 116 is configured to perform feature extraction and/or image segmentation of the imagery 218, although any other suitable techniques are also contemplated. The image processing performed on the imagery 218 may be used to locate and/or identify the item 215, and/or to determine a positioning and/or orientation of the end effector 105 relative to the item 215. In some embodiments, the memory 208 comprises item information 212 associated with the different items in the environment. Visual characteristics included in the item information 212 may be used by the image processing module 116 to identify the item 215 and/or identify an orientation of the item 215 (e.g., a comparison of the imagery 218 with the item information 212).

In some embodiments, the image processing module 213 is further configured to identify a target contact region 214 of the item 215. The target contact region 214 represents a region of the item 215 that is estimated to provide a relatively good seal with the interface system of the end effector 105. The target contact region 214 may be determined based on a current orientation of the item 215, and may be determined based on the assumption that the item 215 will not be displaced and/or rotated prior to the end effector 105 contacting the item 215. The image processing module 213 may comprise one or more predefined rules for determining the target contact region 214. For example, a first rule may specify that planar surfaces are preferred for the target contact region 214 over rounded surfaces or corners, a second rule may specify that larger surfaces are preferred to smaller surfaces, and a third rule may specify that a corner having a linear (or other elongated) intersection is preferred to a corner having a point intersection. The one or more predefined rules may be based on properties of the end effector 105 (e.g., values or ranges of size, shape, vacuum force, etc.), which may reflect deformation of the interface system by the one or more actuators 160. The one or more predefined rules may also be prioritized relative to each other.

For example, assume that the item 215 has a rectangular shape, with relatively large planar surfaces (e.g., larger than an inner diameter of the inner recess of the end effector 105 in an undeformed state) on two sides, and relatively small planar surfaces (e.g., smaller than the inner diameter) on the other four sides. However, assume further that the large planar surfaces of the item 215 are partially or completely inaccessible by the end effector 105 in a current orientation of the item 215 (e.g., the item 215 is obscured by other items, resting against a surface such as a sidewall or floor, etc.). As it is not feasible to contact only a large planar surface in the current orientation of the item 215, the image processing module 213 may select a "next-best" target contact region, such as an elongated intersection of two sides as specified by the example third rule above.

In conjunction with identifying the target contact region 214, the image processing module 213 may determine a geometry of the target contact region 214. Based on the geometry of the target contact region 214, the controller 205 may send control signals to the one or more actuators 160 to deform the interface system of the end effector 105. The controller 205 may additionally or alternately send control signals to the one or more actuators 235 to reorient the interface system relative to the item 215 prior to contacting the item 215.

In some embodiments, the controller 205 is configured to transmit control signals to the one or more actuators 235 to provide the end effector 105 with a desired positioning and/or orientation for contacting and/or handling the item 215. In the diagram 200, the end effector 105 has been brought into contact with the item 215 resting on a surface 220. In some alternate embodiments, the end effector 105 and/or the item 215 may be manually moved to provide the contacting relationship, and/or to displace the end effector 105 and the suctioned item 215 to the predefined location. For example, the end effector 105 may include a handle allowing a user to rotate and/or displace the end effector 105.

In some embodiments, the controller 205 is configured to transmit control signals to a vacuum source 230 to selectively apply a vacuum to the inner recess of the end effector 105. The vacuum source 230 may have any suitable implementation, such as a vacuum pump connected to the vacuum port 150 via a flexible hose. Applying the vacuum to the inner recess operates to suction the item 215 to the end effector 105. In some embodiments, the controller 205 transmits control signals to the vacuum source 230 to release the vacuum when the item 215 has been moved to the predefined location.

The controller 205 may further transmit control signals to the one or more actuators 235 to displace the end effector 105 and the now-suctioned item 215 to a predefined location, which in some cases may be specified by destination information 210 included in the memory 208 and associated with the item 215. The destination information 210 may have any suitable form, such as a destination within the warehouse (e.g., a particular container 245 or a particular environment location), a destination external to the warehouse (e.g., a portion of a destination mailing address or a particular vehicle for external transport), and so forth. In some embodiments, the controller 205 acquires the destination information 210 from one or more computing devices that are networked with the controller 205.

Figure 3:
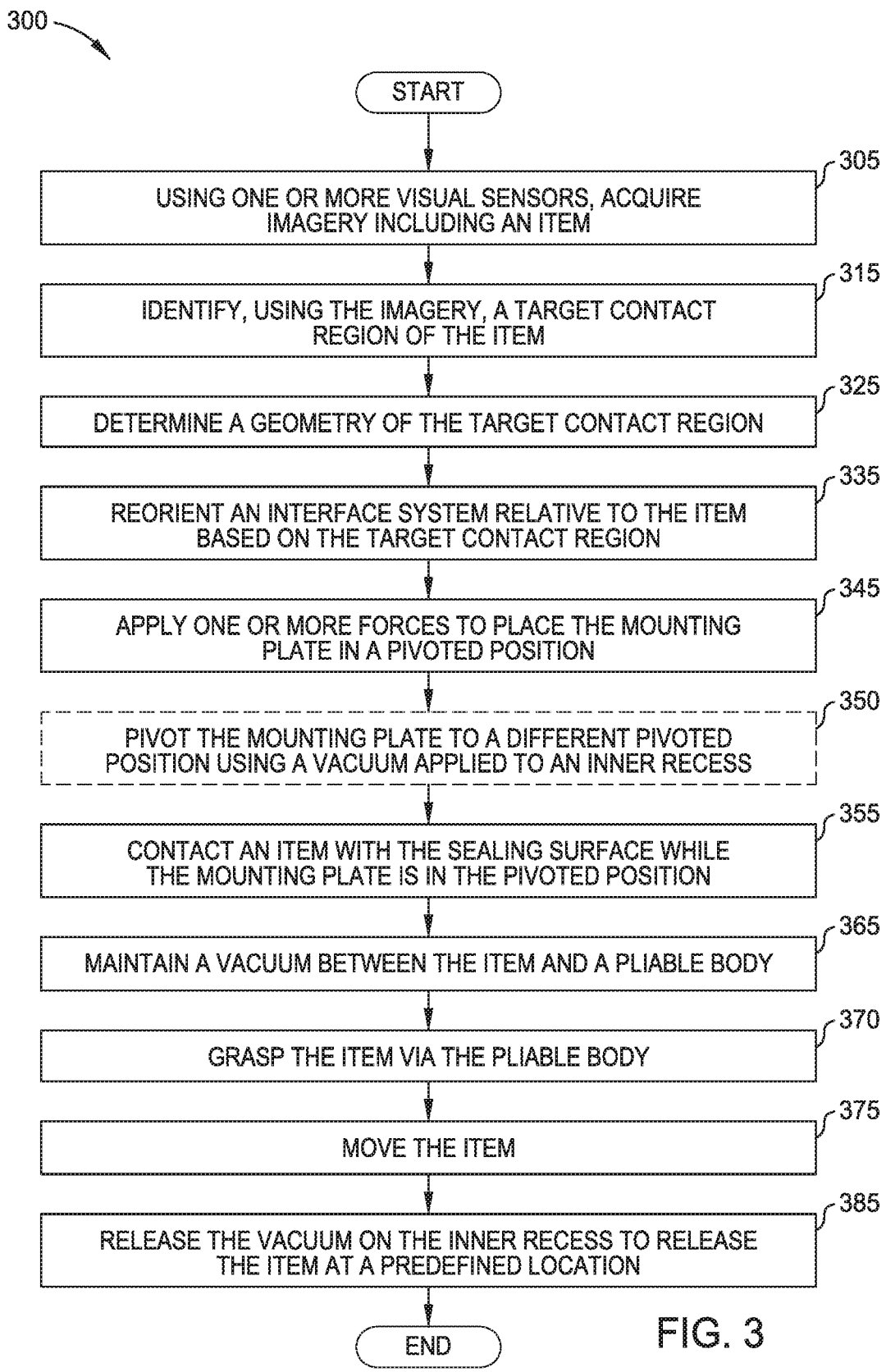
FIG. 3 illustrates an exemplary method of moving items using an end effector, according to various embodiments.

Next, method 300 of FIG. 3 will be described with reference to FIGS. 2A and 2B. The method 300 begins at block 305, where the controller 205 using one or more visual sensors 216 acquires imagery 218 including an item 215. At block 315, the image processing module 213 identifies, using the imagery 218, a target contact region 214 of the item 215. At block 325, the image processing module 213 determines a geometry of the target contact region 214.

At block 335, the controller 205 reorients an interface system of the end effector relative to the item 215 based on the target contact region 214. At block 345, one or more forces are applied to place a mounting plate of the interface system in a deformed position. In some embodiments, applying the one or more forces causes a first portion of the mounting plate to pivot about a first axis. The first portion is movable relative to at least a second portion of the mounting plate. In some embodiments, applying the one or more forces causes the second portion of the mounting plate to move. In some embodiments, the controller 205 deforms, using one or more actuators 160, the interface system according to one or more degrees of freedom. At an optional block 350, the mounting plate is moved to a different position using a vacuum applied to an inner recess. In some embodiments, blocks 345 and 350 are performed in conjunction with each other. In other embodiments, only the vacuum is used to move the mounting plate. At block 355, a sealing surface of the end effector contacts the item 215 while the mounting plate is in the deformed position (which may correspond to a state in which the interface system is deformed).

At block 365, the controller 205 maintains a vacuum between the item and a pliable body of the interface system. The vacuum may be applied to an inner recess of the end effector. At block 370 grasps the item via the pliable body. At block 375, the controller 205 moves the item. At block 385, the controller 205 releases the vacuum on the inner recess to release the item at a predefined location. The method 300 ends following completion of block 385.

Figure 4A:
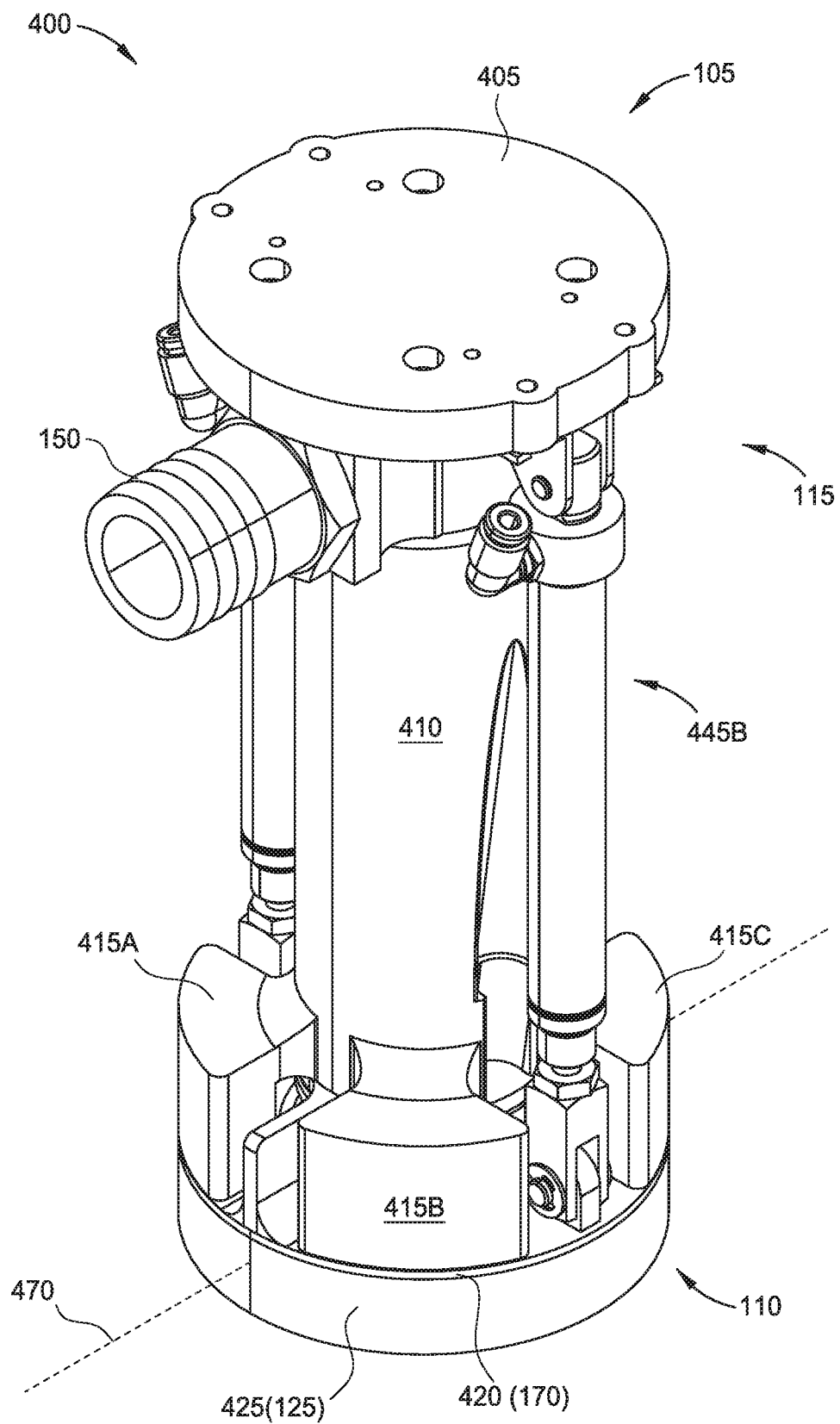
FIGS. 4A-4D are views of an end effector having a deformable interface system, according to various embodiments.
Figure 4B:
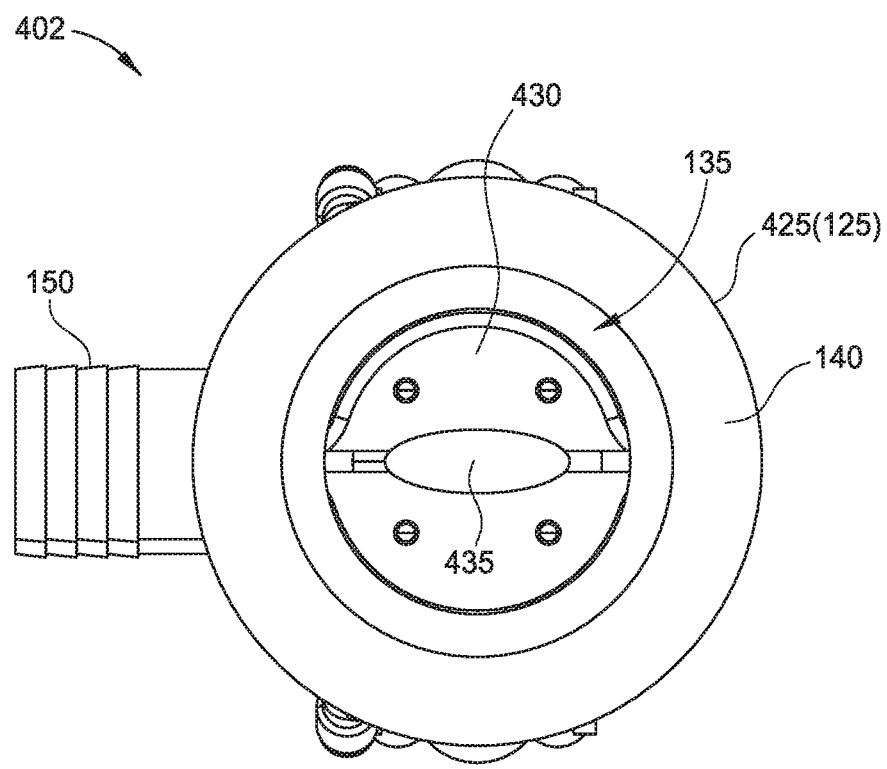
Figure 4C:
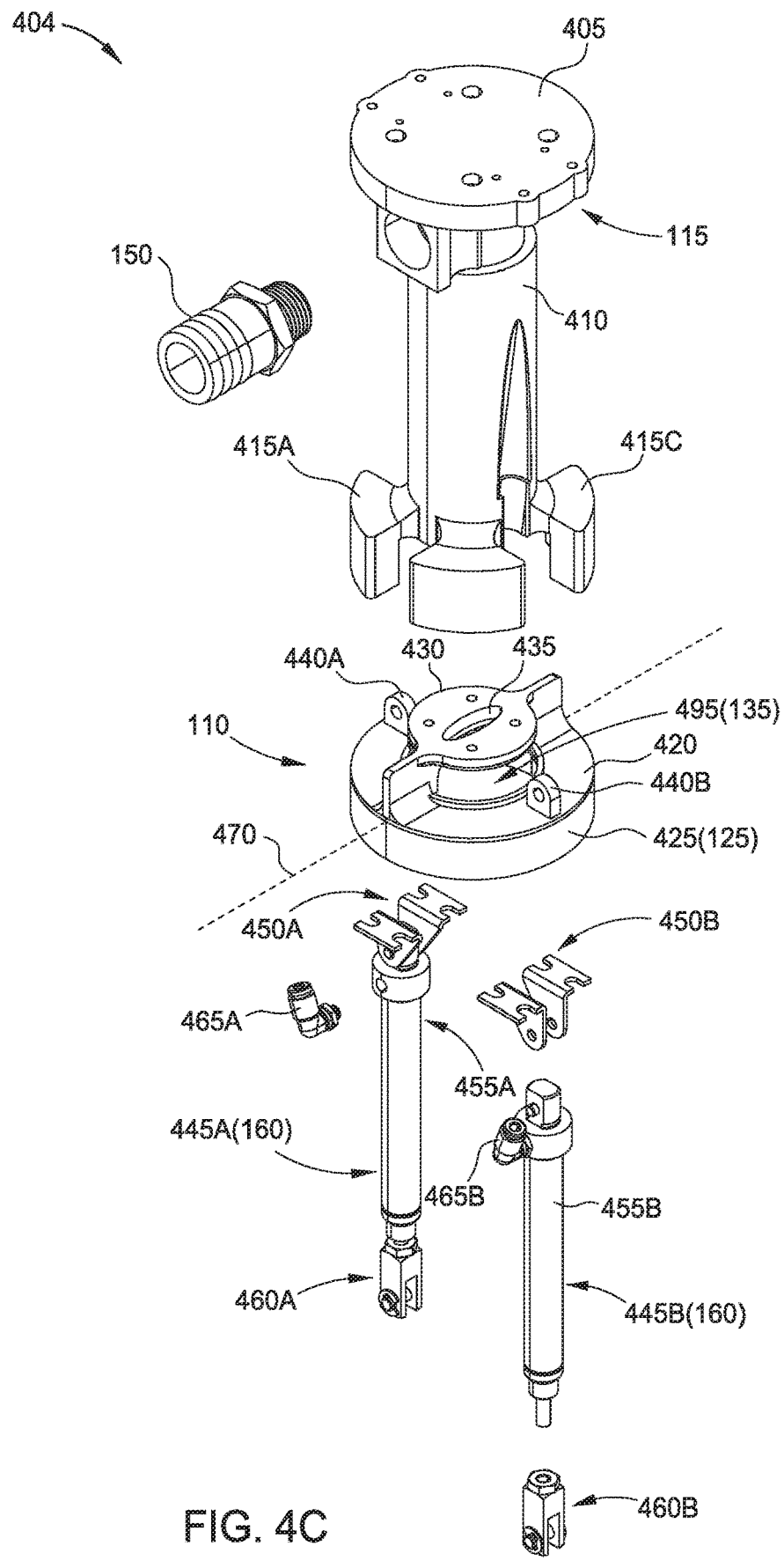

FIGS. 4A-4C are views 400, 402, 404 of an end effector 105 having a deformable interface system 110, according to various embodiments. More specifically, the view 400 provides a perspective view of the end effector 105, the view 402 provides a bottom view of the end effector 105, and the view 404 provides an exploded perspective view of the end effector 105. The features illustrated in views 400, 402, 404 may be used in conjunction with other embodiments discussed herein.

The manifold 115 comprises a base 405 attached to a support 410. As shown, the base 405 represents a proximal end of the end effector 105 and the manifold 115. The base 405 defines a plurality of openings through which fasteners may be inserted, e.g., when attaching the manifold 115 to an external system (such as a robotic arm) and/or when attaching one or more actuators to the base 405. In some embodiments, the base 405 is rigid and is formed of an inelastic material such as a metal or plastic, or is formed of an elastic material and dimensioned to provide rigidity (e.g., having a sufficient thickness).

The support 410 attaches at a proximal end to the base 405, and at a distal end to the interface system 110. In some embodiments, the support 410 is rigid and is formed of an inelastic material such as a metal or plastic, or is formed of an elastic material and dimensioned to provide rigidity (e.g., having a sufficient thickness). As shown, the base 405, the support 410, and the interface system 110 are concentric, but this is not a requirement.

In some embodiments, the support 410 is tubular and the vacuum port 150 is in fluid communication with the interface system 110 via an inner recess 135 of the support 410. In other embodiments, the vacuum port 150 is in fluid communication with the interface system 110 via means external to the support 410, such as rigid and/or flexible conduit.

A plurality of stops 415A, 415B, 415C are disposed at a distal end of the manifold 115 and are spaced around a perimeter thereof. The stops 415A, 415B, 415C are configured to limit or stop motion of the interface system 110 in the proximal direction. For example, the stops 415A, 415B, 415C may seat against portions of the interface system 110 in an undeformed state, and may ensure that the interface system 110 deforms only in the distal direction from the undeformed state.

The interface system 110 comprises a mounting plate 420 (one example of the mounting plate 170) attached to a foam suction cup 425 (one example of the pliable body member 125). In some embodiments, the mounting plate 420 and the foam suction cup 425 may be attached through one of an adhesive layer, a glue, and a fabric bladder. As shown, the foam suction cup 425 comprises an annular shape that defines the inner recess 135. Although shown as being a continuous shape, in some cases the foam suction cup 425 may define one or more gaps that accommodate the movement of material of the foam suction cup 425 during deformation thereof. For example, the gaps may extend radially from a center of the foam suction cup, and may be arranged relative to known locations where force is applied to deform the interface system 110. The one or more gaps may be dimensioned such that only a minor amount of suction force is lost when the foam suction cup 425 is in an undeformed state. Further, the one or more gaps may be partially or fully closed as material from the foam suction cup 425 moves during deformation by the actuators.

The mounting plate 420 may have any suitable implementation for pivoting and/or deforming responsive to applied forces. The mounting plate 420 comprises a plurality of portions that are moveable relative to each other. Stated another way, at least a first portion of the mounting plate 420 is moveable relative to at least a second portion of the mounting plate 420. In some embodiments, the mounting plate 420 comprises a plurality of separate plate members connected by discrete hinges defining axes about which the plate members pivot relative to one another. The plurality of plate members may include rigid and/or flexible structures. In the case of flexible structures, the individual plate members may bend or deform, thereby providing degrees of freedom in addition to those provided by the hinges. In other embodiments, the mounting plate 420 is a singular (i.e., monolithic), flexible plate having one or more axes about which the plate is moveable.

In some embodiments, the mounting plate 420 is formed as a pivotable plate having one or more pivot axes. In some embodiments, the mounting plate 420 has a greater rigidity than the foam suction cup 425, and may be formed of different material(s) and/or differently dimensioned. For example, the greater rigidity of the mounting plate 420 may allow the one or more actuators to deform the foam suction cup 425 without causing wear or damage thereto. In one embodiment, the mounting plate 420 comprises a rubber material, but other types of pliable materials are also possible. In some embodiments, the mounting plate 420 comprises a distal surface 497 attached to the planar surface of the pliable body member 125, and a proximal surface 496 opposing the distal surface 497. In some alternate implementations, the one or more actuators may contact and deform the pliable body member 125 directly (i.e., without an intermediate mounting plate 420).

In some embodiments, the mounting plate 420 further comprises a support 430 extending from the proximal surface 496 at one or more regions of increased rigidity of the mounting plate 420, and the support 430 is dimensioned to interface with a corresponding one or more portions of the manifold 115. As shown, the support 430 comprises a plurality of wall portions 485A, 485B extending from the proximal surface 496 of the mounting plate 420, and a raised portion 490 connected between the wall portions 485A, 485B defining a plurality of openings through which fasteners may be inserted to attach the interface system 110 with the manifold 115. The raised portion 490 is shown as having a circular shape, and is arranged concentrically with the proximal surface 496 of the mounting plate 420 and with the foam suction cup 425.

As shown, the mounting plate 420 defines a central opening 495 that supports fluid communication of the inner recess 135 with the manifold 115. In some cases, the central opening 495 has a diameter matching that of the inner recess 135, but this is not a requirement. In some embodiments, the raised portion 490 further defines an opening as a connection 435 that supports fluid communication of the inner recess 135 with the manifold 115.

In some embodiments, the plurality of wall portions 485A, 485B are arranged on opposing sides of the central opening 495. As shown, the wall portions 485A, 485B are aligned along a longitudinal axis extending across a diameter of the mounting plate 420. The wall portions 485A, 485B represent portions of increased rigidity for the mounting plate 420. The longitudinal axis is parallel to an axis 470, about which one or more portions of the mounting plate 420 may move. Although two wall portions 485A, 485B aligned along the longitudinal axis are shown, alternate implementations of the mounting plate 420 may include different numbers of wall portions, wall portions that are aligned across the mounting plate 420 away from the diameter, and so forth.

In some embodiments, the stops 415A, 415B, 415C of the manifold 115 are spaced apart to accommodate the interaction of one or more actuators with the interface system 110. As shown, two linear actuators 445A, 445B (examples of the one or more actuators 160) are arranged between the interface system 110 and the base 405. The linear actuator 445A comprises a pneumatic cylinder 455A attached with the base 405 via a base mount 450A, and attached with the interface system 110 via a rod mount 460A. The linear actuator 445B comprises a pneumatic cylinder 455B attached with the base 405 via a base mount 450B, and attached with the interface system 110 via a rod mount 460B.

In some embodiments, a plurality of ears 440A, 440B extend from the proximal surface 496 of the mounting plate 420. As shown, the ears 440A, 440B are arranged at respective lateral portions of the interface system 110, and the linear actuators 445A, 445B are arranged to apply a force at the lateral portions. The rod mount 460A is attached to the interface system 110 at the ear 440A, and the rod mount 460B is attached to the interface system 110 at the ear 440B. The rod mounts 460A, 460B are shown as clevis-type mounts, but other types of rod mounts are also possible.

The linear actuators 445A, 445B are configured to extend and retract based on signaling provided via respective ports 465A, 465B. For example, based on a desired deformation of the interface system 110, the controller may provide control signals to cause compressed air to be delivered or removed via the ports 465A, 465B. As shown, the linear actuators 445A, 445B are configured to extend primarily in a direction that is parallel to the support 410. In some cases, as the interface system 110 is deformed, the linear actuators 445A, 445B may experience some minor rotation. Other implementations of the end effector 105 may have linear actuators that extend at different angles. In some embodiments, the linear actuators 445A, 445B may extend and/or retract responsive to application of a vacuum to the vacuum port 150. For example, the linear actuators 445A, 445B may be maintained in a neutral configuration (e.g., not applying a force to the ears 440A, 440B) and allowed to extend and/or retract. In another example, the linear actuators 445A, 445B may apply forces to the interface system 110, and are allowed to extend further responsive to application of the vacuum.

Figure 8:
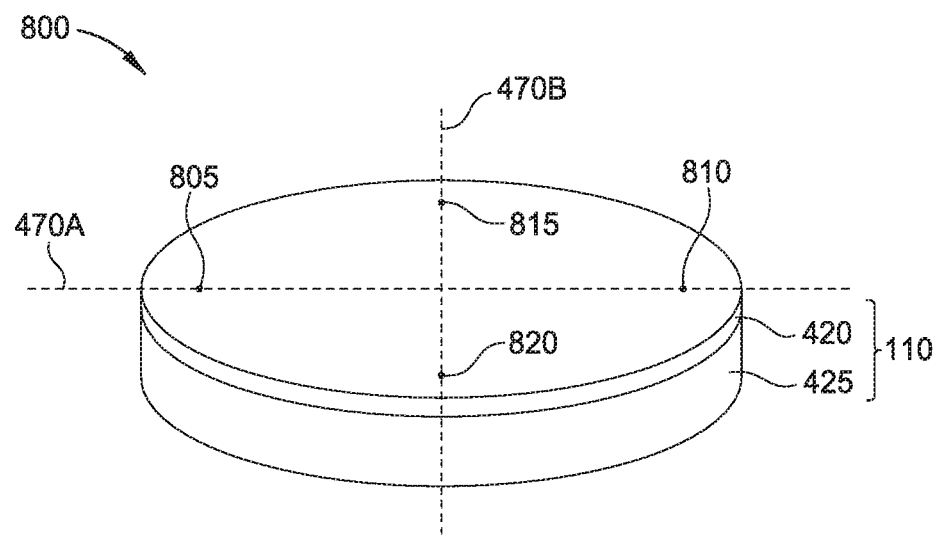
FIG. 8 illustrates an exemplary interface system deformable according to multiple rotational degrees of freedom, according to various embodiments.

As shown, the two linear actuators 445A, 445B are arranged on opposing sides of the foam suction cup 425 (i.e., the pliable body member 125), and are operable to deform the interface system 110 according to a same rotational degree of freedom. For example, increasing the lengths of the linear actuators 445A, 445B causes the interface system 110 to be rotationally deformed about an axis 470. Other arrangements of the actuators relative to the interface system 110 are also possible. For example, one or more additional actuators may be arranged to rotationally deform the interface system 110 about an axis different than the axis 470. One example arrangement with multiple rotational degrees of freedom is depicted in diagram 800 of FIG. 8, where one or more actuators may be arranged to apply force at predefined locations 815 and/or 820 to deform the interface system 110 about a first axis 470A. One or more actuators may be arranged to apply force at predefined locations 805 and/or 810 to deform the interface system 110 about a second axis 470B that is orthogonal to the first axis 470A. Other embodiments may have one or more axes with different (e.g., non-orthogonal) orientations. Further, in other embodiments the one or more actuators may be configured to displace portions of the pliable body member 125, which may be in addition to, or alternately to, the rotation discussed above.

Figure 4D:
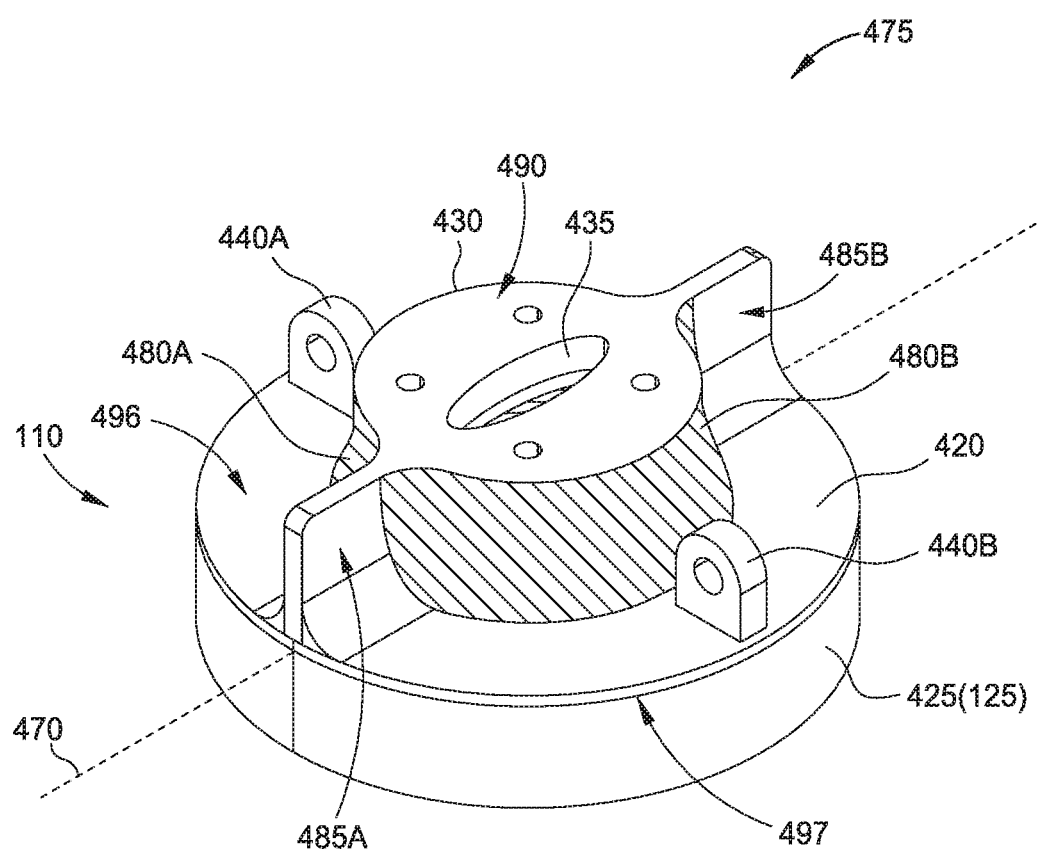

Further, as illustrated in view 475 of FIG. 4D, the interface system 110 may comprise a sleeve or other material layer that ensures that the inner recess 135 remains in fluid communication with the manifold 115 via the connection 435, while being fluidically isolated from the ambient environment through the interface system 110. For example, the sleeve may extend between and/or may partially or fully surround the support 430 and the proximal surface 496 of the mounting plate 420. As shown in the view 475, the interface system 110 may comprise sections 480A, 480B extending between the support 430 and the proximal surface 496 of the mounting plate 420. The sections 480A, 480B comprise a flexible material, such that the mounting plate 420 is capable of moving without allowing vacuum to escape through the space between the mounting plate 420 and the support 430.

In some embodiments, the sections 480A, 480B may be integrally formed with the support 430 and/or the mounting plate 420. In other embodiments, the sections 480A, 480B may be formed of material(s) different than other portions of the interface system 110. In one non-limiting example, the sections 480A, 480B comprises a plastic film having a sufficient thickness to withstand the operating pressures associated with applying a vacuum to the inner recess 135 via the connection 435. The sections 480A, 480B may be attached with the support 430 and/or the mounting plate 420 according to any suitable techniques. Continuing the previous example, the plastic film may be stretched over and/or adhered to the support 430 and/or the mounting plate 420.

Figure 5:
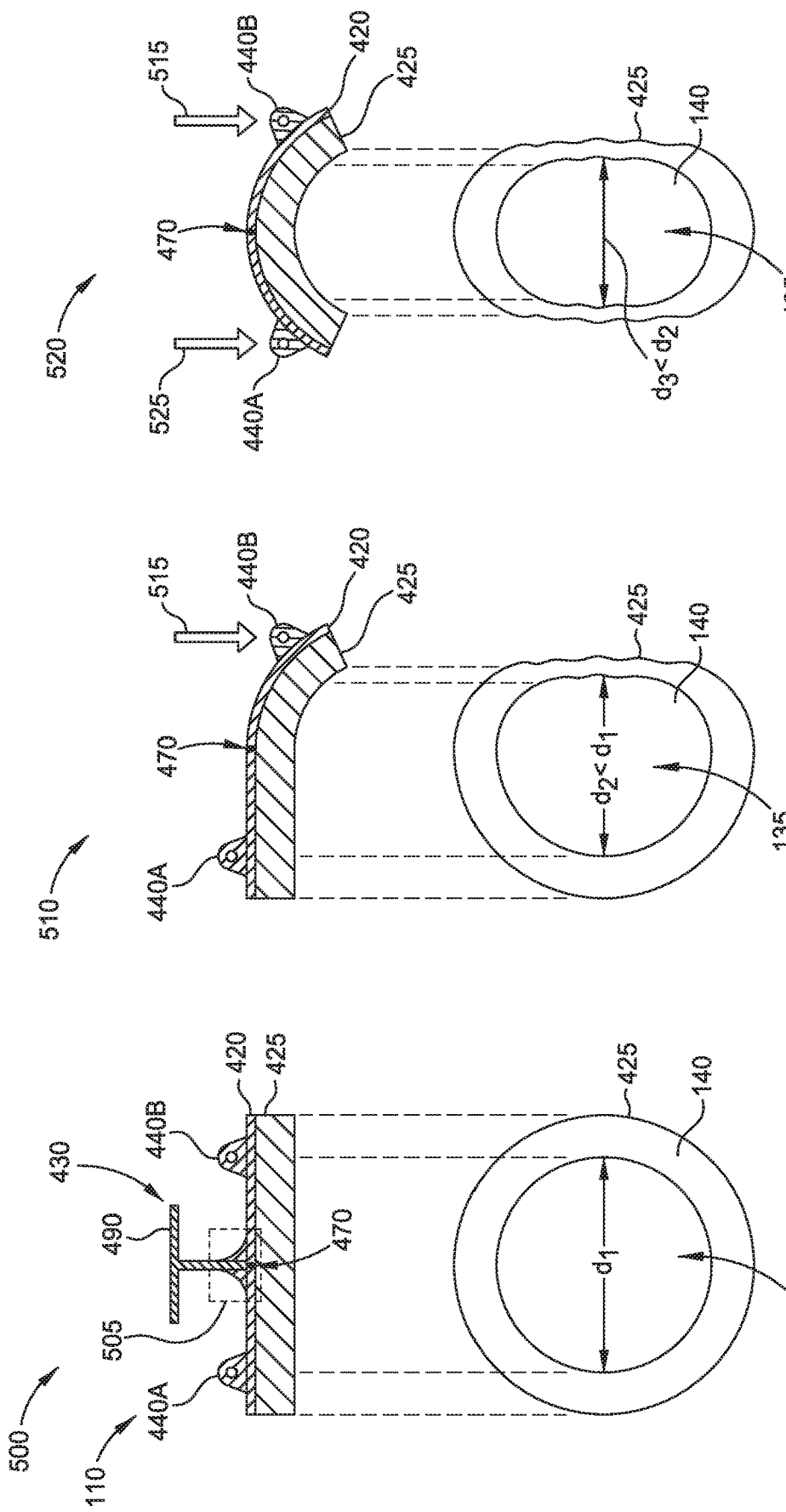
FIG. 5 illustrates exemplary deformation states of a deformable interface system, according to various embodiments.

FIG. 5 illustrates exemplary deformation states of a deformable interface system, according to various embodiments. More specifically, diagram 500 illustrates an interface system in an undeformed state, diagram 510 illustrates the interface system with a first force 515 applied, and diagram 520 illustrates the interface system with a first force 515 and a second force 525 applied. The features illustrated in diagrams 500, 510, 520 may be used in conjunction with other embodiments, such as the interface system 110 depicted in FIGS. 4A-4C.

In the diagram 500, the mounting plate 420 has an increased rigidity in region 505 and forces applied at lateral portions of the interface system (e.g., through the ears 440A, 440B) tend to rotationally deform the foam suction cup 425 relative to the region 505. As shown, the axis 470 extends through the interface system. In the undeformed state, the inner recess 135 defined by the foam suction cup 425 has a circular shape with a diameter $d_1$ (when viewed from a bottom view). The sealing surface 140 of the foam suction cup 425 has an annular shape with a constant width.

In the diagram 520, the first force 515 is applied through the ear 440B (e.g., by increasing a length a linear actuator attached to the ear 440B). The side of the foam suction cup 425 corresponding to the first force 515 is rotationally deformed, which alters the geometry of the inner recess 135 and the sealing surface 140. More specifically, the inner recess 135 has an oval-like shape from the bottom view, with a diameter $d_2$ that is less than diameter $d_1$. The sealing surface 140 has a corresponding oval-like shape with varying widths.

In the diagram 540, the second force 525 is applied through the ear 440A, in conjunction with application of the first force 515. The side of the foam suction cup 425 corresponding to the second force 525 is also rotationally deformed, which alters the geometry of the inner recess 135 and the sealing surface 140. More specifically, the inner recess 135 has an ellipse-like shape from the bottom view, with a diameter $d_3$ that is less than diameter $d_2$. The inner recess 135 has a long (major) axis and a short (minor) axis, which may provide improved performance for suctioning elongated items aligned with the long axis. The sealing surface 140 has a corresponding ellipse-like shape with varying widths.

In some embodiments, application of the first force 515 and/or the second force 525 to pivot and/or deform the foam suction cup 425 causes the item to be centered in the grasp of the interface system 110. Stated another way, pivoting and/or deforming the foam suction cup 425 can urge the item toward a centerline of the interface system 110, which may allow a better seal to be formed with the item. With the ability to self-center the item, the interface system 110 may be configured to grasp the item despite a less precise (or less accurate) operation of moving and/or orienting the end effector.

Figure 6:
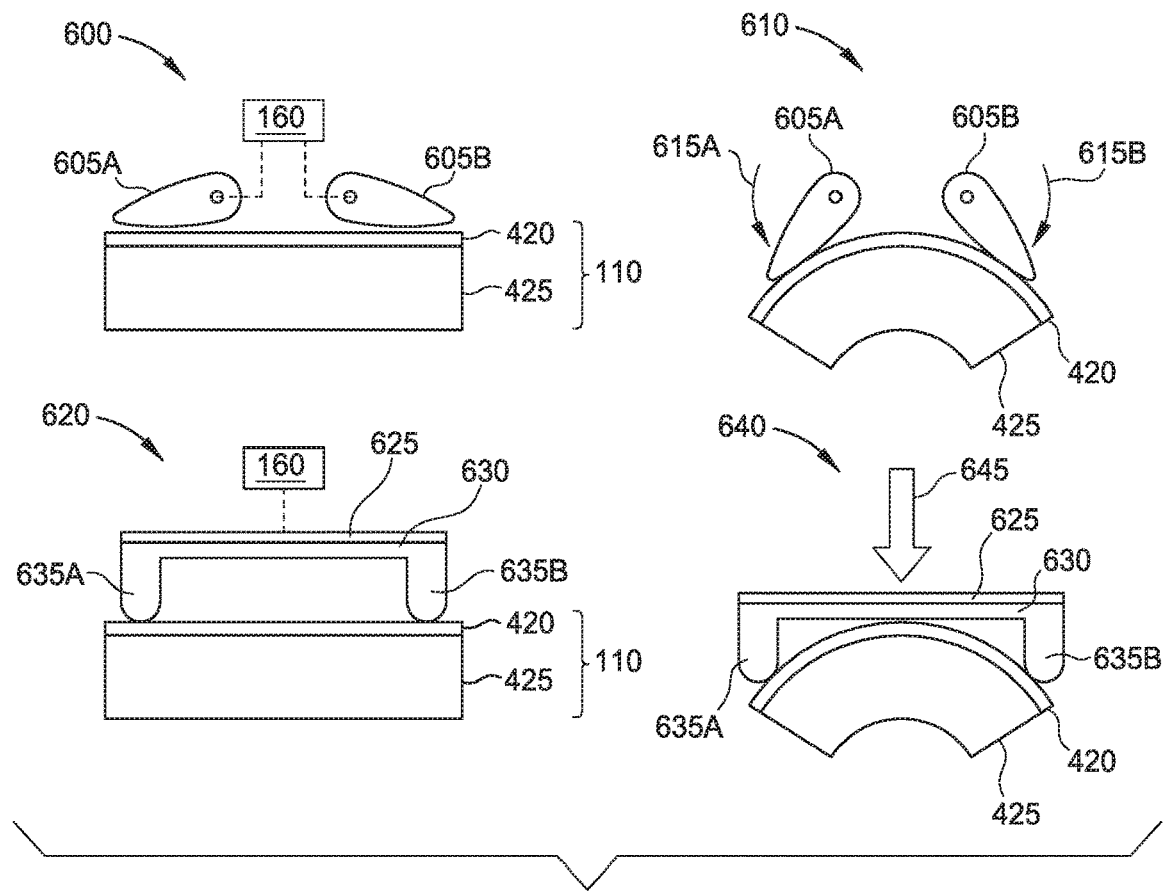
FIG. 6 illustrates exemplary actuators operable to apply a force to a deformable interface system, according to various embodiments.

FIG. 6 illustrates exemplary actuators operable to apply a force to a deformable interface system 110, according to various embodiments. More specifically, diagrams 600, 610 illustrate one or more actuators 160 (e.g., rotary actuators such as motors) connected with cams 605A, 605B. Diagrams 620, 640 illustrate one or more actuators 160 (e.g., linear or rotary actuators) connected with a collar 625. The features illustrated in the diagrams 600, 610, 620, 640 may be used in conjunction with other embodiments.

In the diagram 600, the interface system 110 is in an undeformed state, as the cams 605A, 605B are positioned such that force is not applied by the cams 605A, 605B to the mounting plate 420. In the diagram 610, the cams 605A, 605B are rotated and apply force to the mounting plate 420, deforming the interface system 110. In some embodiments, the cams 605A, 605B are independently operable.

The collar 625 is configured to selectively apply force 645 to a spacer 630 comprising features 635A, 635B. In one example, the collar 625 is threaded, and is rotationally actuated to apply the force 645 (as shown, in a downward direction toward the mounting plate 420). In another example, the collar 625 is linearly actuated to apply the force 645.

When the force 645 is applied to the spacer 630, the features 635A, 635B transmit the force to the mounting plate 420, deforming the interface system 110. In the diagram 620, the interface system 110 is in an undeformed state, as the collar 625 is positioned such that no force is applied to the spacer 630. In the diagram 640, the collar 625 is positioned such that the force 645 is applied to the spacer 630.

Figure 7:
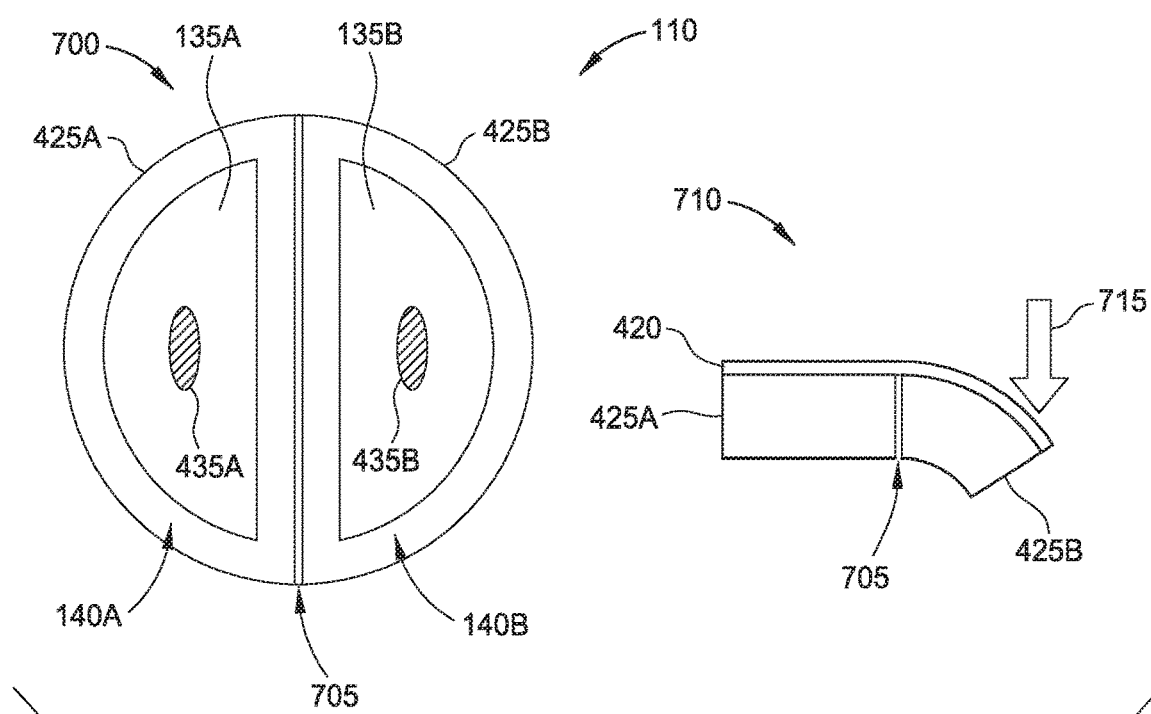
FIG. 7 illustrates an exemplary deformable interface system comprising multiple pliable body members, according to various embodiments.

FIG. 7 illustrates an exemplary deformable interface system 110 comprising multiple pliable body members, according to various embodiments. More specifically, the interface system 110 comprises two foam suction cups 425A, 425B. The features illustrated in diagrams 700, 710 may be used in conjunction with other embodiments.

In the diagram 700, the foam suction cups 425A, 425B have a semicircular shape (or "D" shape) and are arranged adjacent to each other. The foam suction cup 425A defines an inner recess 135A and a sealing surface 140A, and the foam suction cup 425B defines an inner recess 135B and a sealing surface 140B. The foam suction cups 425A, 425B may be separated by a gap 705.

Each of the foam suction cups 425A, 425B comprises a respective connection 435A, 435B supporting fluid communication of the inner recesses 135A, 135B with one or more vacuum sources. In some embodiments, the connections 435A, 435B are in fluid communication with independent vacuum sources via separate paths through the manifold or conduit. In other embodiments, the connections 435A, 435B are connected with a single vacuum source, and a vacuum may be dynamically applied to a selected one of the inner recesses 135A, 135B.

In some embodiments, one or more actuators apply a force 715 to deform the interface system 110, which alters a relative orientation of the sealing surfaces 140A, 140B. Altering the relative orientation may be performed in addition to, or as an alternate to, altering a geometry of one or both of the sealing surfaces 140A, 140B.

Further, while the diagram 700 illustrates two pliable body members, alternate implementations may include any suitable number of pliable body members. For example, an array of small pliable body members (e.g., having an area substantially less than an overall area of the interface system) may be used.

Figure 9:
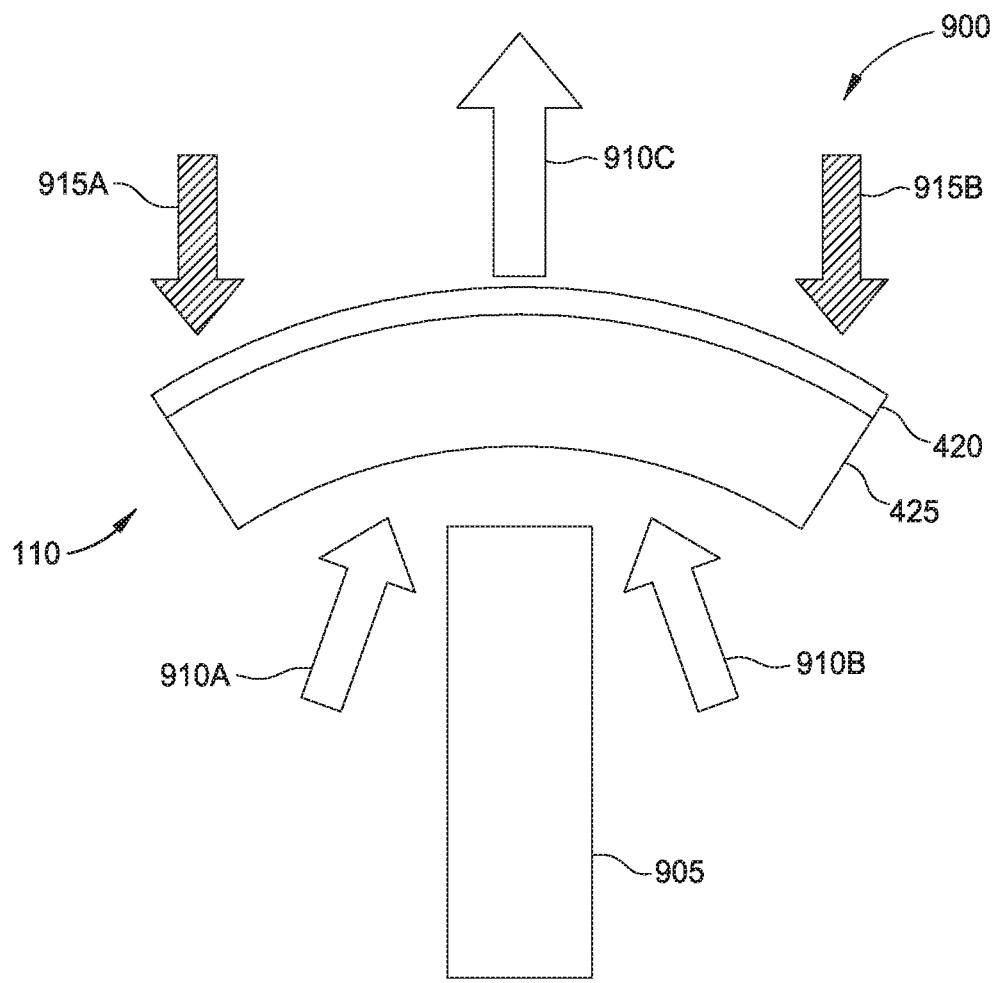
FIG. 9 illustrates deformation of an interface system responsive to an applied vacuum, according to various embodiments.

FIG. 9 illustrates deformation of an interface system 110 responsive to an applied vacuum, according to various embodiments. In some cases, diagram 900 may represent the deformation of the interface system 110 from a neutral (or non-deformed or non-pivoted) state or position. In other cases, the diagram 900 may represent the deformation of the interface system 110 from a deformed or pivoted state or position, e.g., after force is applied by one or more actuators. The features discussed with respect to the diagram 900 may be used in conjunction with other embodiments described herein.

In the diagram 900, the applied vacuum causes airflows 910A, 910B to pass through the interface system 110, which are combined within an airflow 910C. More specifically, the airflows 910A, 910B pass between an item 905 and the foam suction cup 425, which reduces local pressure and has the effect applying forces 915A, 915B to pivot the mounting plate 420 (e.g., a deformable or pivotable plate).

As mentioned above, the applied vacuum may be used to pivot the mounting plate 420 in isolation from, or in conjunction with, pivoting the mounting plate 420 using one or more actuators. In some embodiments, the one or more actuators are used to pivot the mounting plate 420 into a pivoted position (e.g., based on a target contact region) and the applied vacuum pivots the plate to a different pivoted position. The item 905 may then be contacted with the sealing surface of the foam suction cup 425 while the mounting plate 420 is in the different pivoted position.

Figure 10A:
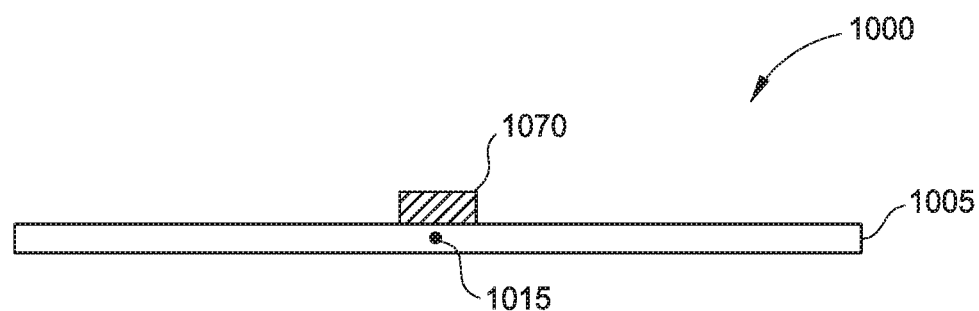
FIGS. 10A-10C illustrate exemplary implementations of a movable plate, according to various embodiments.
Figure 10B:
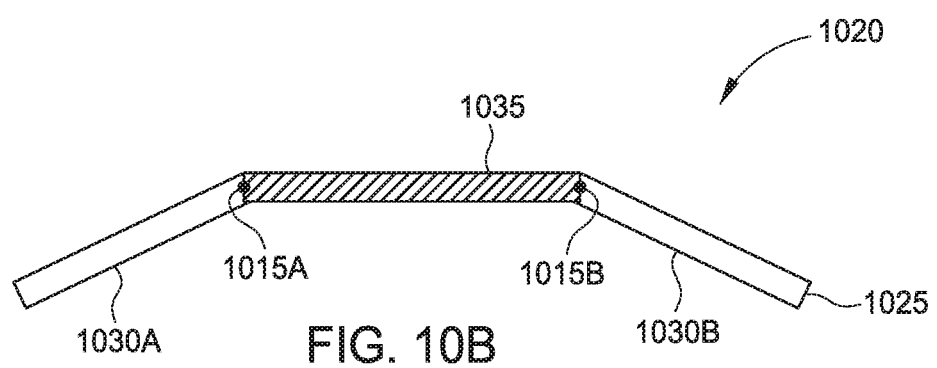
Figure 10C:
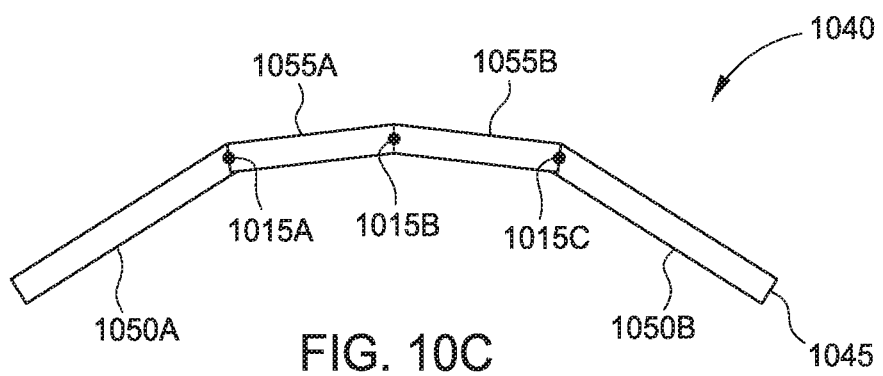

FIGS. 10A-10C illustrate exemplary implementations of a pivotable plate, according to various embodiments. The features described with respect to diagrams 1000, 1020, 1040 may be used in conjunction with other embodiments described herein.

In diagram 1000, a pivotable plate 1005 is pivotable relative to a pivot axis 1015. As shown, the pivotable plate 1005 has a rectangular cross-section, which may correspond to an annular shape or a rectangular annulus shape. In some embodiments, the pivotable plate 1005 comprises an elastic material, and the pivot axis 1015 corresponds to a particular location along the pivotable plate. In other embodiments, the pivot axis 1015 may represent a discrete pivot (e.g., a hinge) connecting different sections (or portions) of the pivotable plate 1005, which may comprise elastic or inelastic materials.

In some cases, the location of the pivot axis 1015 may be controlled by one or more regions 1010 having a relatively greater rigidity and therefore a reduced tendency to pivot, when compared with other regions. In some embodiments, the pivotable plate 1005 has a uniform thickness and rigidity, and the region 1010 represents an interface of the pivotable plate 1005 with an external structural member. In other embodiments, the pivotable plate 1005 has an increased thickness and rigidity at the region 1010.

In diagram 1020, a pivotable plate 1025 is pivotable relative to pivot axes 1015A, 1015B. The pivotable plate 1025 comprises a rigid section 1035 disposed between sections 1030A, 1030B. In some embodiments, the sections 1030A, 1030B are rigid and do not pivot and/or deform. In other embodiments, the sections 1030A, 1030B are flexible and may pivot and/or deform responsive to applied forces. The pivot axes 1015A, 1015B may represent locations along the pivotable plate 1025 or discrete pivot hinges. Beneficially, having additional pivot points along the sections 1030A, 1030B may enable the pivotable plate 1025 (and the associated interface system) to more closely conform to an item to be grasped.

In diagram 1040, a pivotable plate 1045 is pivotable relative to pivot axes 1015A, 1015B, 1015C. The pivotable plate 1045 comprises flexible sections 1050A, 1050B, 1055A, 1055B. The pivot axes 1015A, 1015B, 1015C may represent locations along the pivotable plate 1025. In some embodiments, the pivot axis 1015B may have a first bias value, and the pivot axes 1015A, 1015C may have a second bias value different than the first bias value. In one example, the second bias value is greater than the first bias value, and responsive to applied forces, the pivotable plate 1045 tends to pivot primarily (or initially) about the pivot axis 1015B, and to pivot secondarily (or subsequently) about the pivot axes 1015A, 1015C. In some cases, pivoting about pivot axis 1015B and pivot axes 1015A, 1015C may overlap in time but occur at different rates based at least on the first bias value and the second bias value.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be used to implement embodiments of the disclosure. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An end effector configured to grasp items, the end effector comprising:
    an interface system comprising:
        a mounting plate having at least a first portion pivotable relative to at least a second portion, wherein the first portion is configured to pivot about at least a first pivot axis; and
        a pliable body member attached to the mounting plate and having a sealing surface at its distal end configured to seal with items brought into contact with the end effector, the pliable body member at least partially defining an inner recess;
    a pair of actuators operably connected to the mounting plate and each configured to apply a force to the mounting plate so as to pivot a portion of the mounting plate and deform the pliable body member; and
    a vacuum port in fluid communication with the inner recess.

2. The end effector of claim 1, wherein the pair of actuators are configured to apply the force at lateral portions of the mounting plate so as to pivot the mounting plate and deform the pliable body member.

3. The end effector of claim 1, wherein the pair of actuators are configured to alter a geometry of the sealing surface.

4. The end effector of claim 1, wherein the inner recess is a first inner recess and the interface system further comprises:
    a second pliable body member attached to the mounting plate and that defines a second inner recess.

5. The end effector of claim 4, wherein the vacuum port is in fluid communication with the second inner recess.

6. The end effector of claim 1, wherein the pair of actuators comprise one or more linear actuators.

7. The end effector of claim 6, wherein the one or more linear actuators are each attached to a rigid base arranged at a proximal end of the end effector.

8. A method of grasping an item using an end effector, the end effector comprising an interface system comprising a pliable body having a sealing surface at its distal end, the pliable body attached to a mounting plate having at least a first portion moveable relative to at least a second portion, wherein the first portion is configured to move about at least a first axis, the method comprising:
    applying one or more forces to place the mounting plate in a pivoted position, wherein applying the one or more forces causes the first portion of the mounting plate to pivot about the first axis and alters a geometry of the sealing surface;
    contacting an item with the sealing surface while the mounting plate is in the pivoted position;
    maintaining a vacuum between the item and the pliable body; and
    grasping the item via the pliable body.

9. The method of claim 8, wherein moving the first portion of the mounting plate comprises deforming the mounting plate.

10. The method of claim 8, wherein the sealing surface comprises a first sealing surface,
    wherein the interface system further comprises a second pliable body attached to the mounting plate, the second pliable body having a second sealing surface at the distal end, and
    wherein moving the first portion of the mounting plate comprises altering a relative orientation of the first sealing surface and the second sealing surface.

11. The method of claim 8, wherein applying the one or more forces comprises:
    applying the vacuum to an inner recess of the pliable body.

12. The method of claim 8, wherein applying the one or more forces causes the second portion of the mounting plate to move.

13. The method of claim 8, wherein pivoting the mounting plate comprises:
    applying, using one or more actuators, a force at one or more lateral portions of the mounting plate.

14. The method of claim 13, wherein the one or more actuators comprise two actuators arranged on opposing sides of the pliable body, and wherein moving the mounting plate comprises applying force with each of the two actuators.

15. The method of claim 8, further comprising:
identifying, using imagery acquired by one or more visual sensors, a target contact region of the item; and
determining, using the imagery, a geometry of the target contact region,
wherein pivoting the mounting plate is based on the geometry of the target contact region.

16. The method of claim 15, wherein one or more actuators are used to pivot the mounting plate into the pivoted position, the method further comprising:
pivoting the mounting plate from the pivoted position to a different pivoted position using a vacuum applied to an inner recess of the pliable body.

17. An end effector configured to grasp items, the end effector comprising:
an interface system comprising:
a deformable mounting plate capable of being urged into a deformed configuration upon application of one or more forces, and returning to an undeformed configuration in an absence of the one or more forces; and
a pliable body member attached to the mounting plate and having a sealing surface at its distal end, the pliable body member at least partially defining an inner recess between the sealing surface and the plate, wherein the mounting plate being urged into the deformed configuration alters a geometry of the sealing surface; and
a vacuum port in fluid communication with the inner recess.

18. The end effector of claim 17, wherein the pliable body member is attached to a distal surface of the mounting plate, wherein the mounting plate comprises:
a support comprising a plurality of wall portions extending from a proximal surface of the mounting plate opposing the distal surface,
wherein the plurality of wall portions are arranged on opposing sides of a central opening defined by the mounting plate, and
wherein the plurality of wall portions are aligned along a longitudinal axis extending across a diameter of the mounting plate.

19. The end effector of claim 18, wherein the support further comprises:
a raised portion connected between the plurality of wall portions,
wherein the raised portion defines an opening supporting the fluid communication of the vacuum port with the inner recess.

20. The end effector of claim 19, wherein the raised portion is arranged concentrically with the proximal surface of the mounting plate.

* * * * *